Oct. 11, 1927.  1,645,145
L. KELLNER
SWITCH
Filed July 8, 1925   2 Sheets-Sheet 1
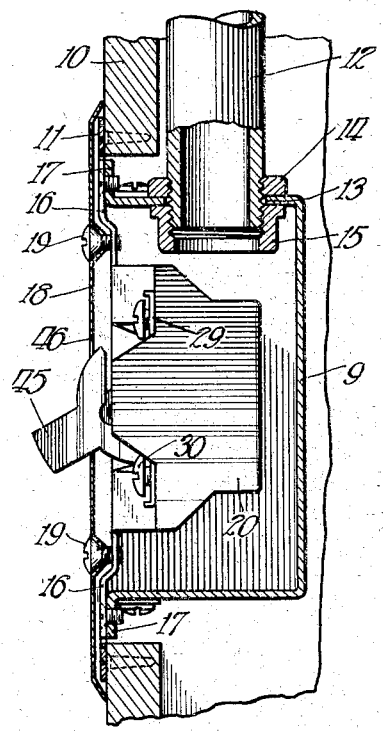
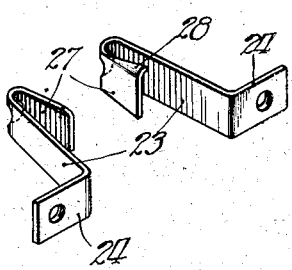
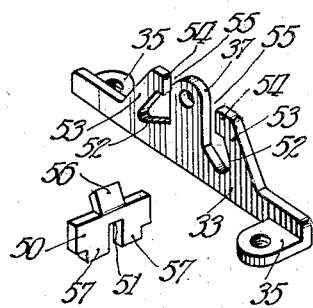
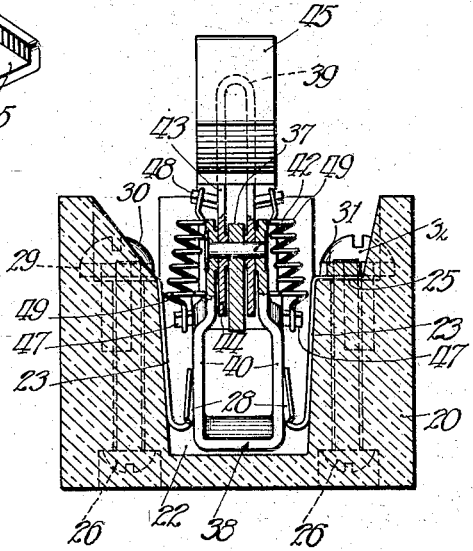
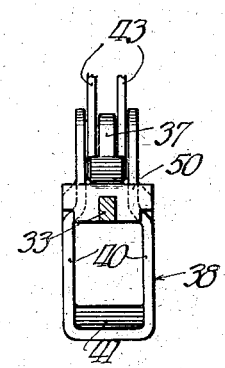
Inventor
Louis Kellner

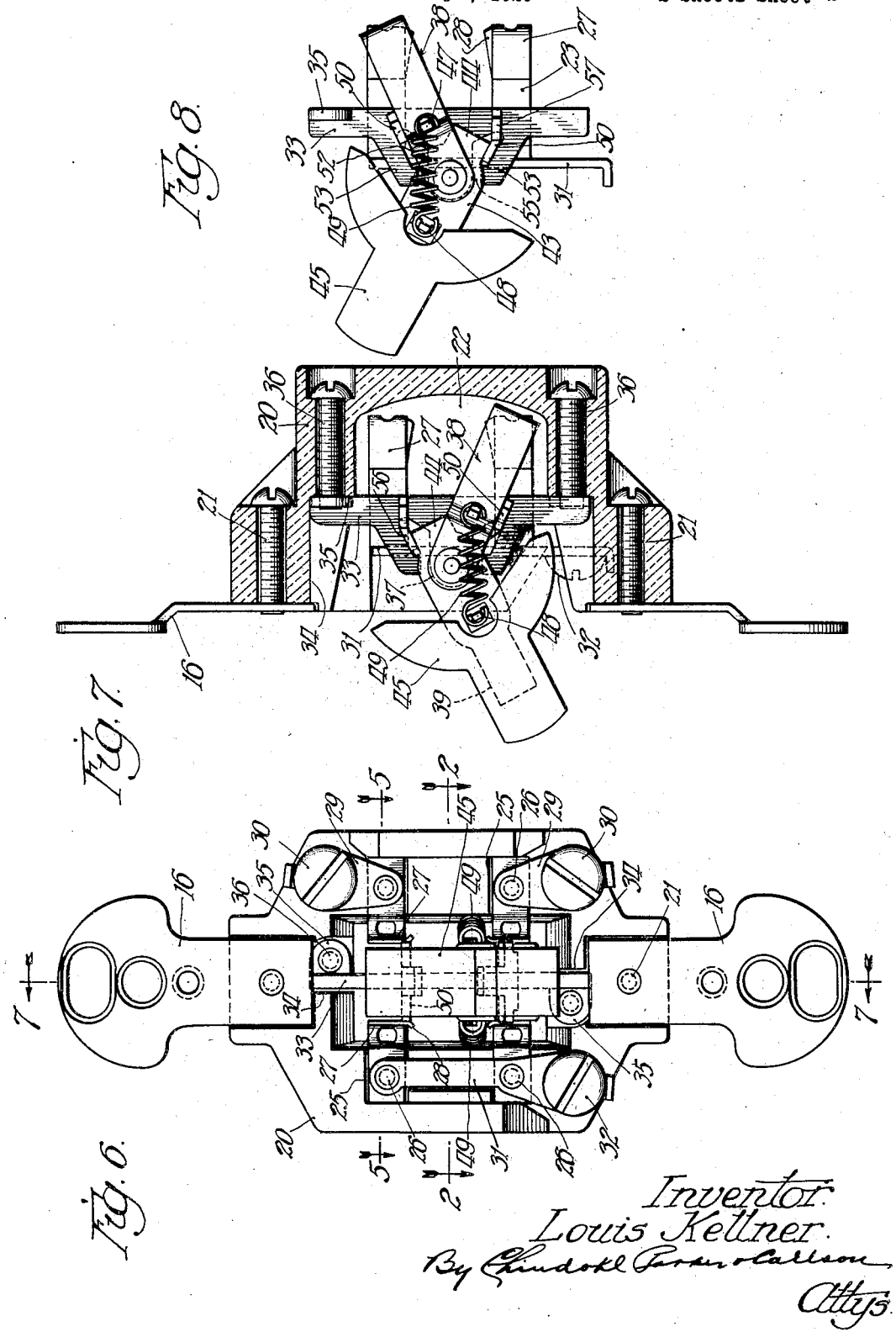
Oct. 11, 1927.
L. KELLNER
SWITCH
Filed July 8, 1925
1,645,145
2 Sheets-Sheet 2
Inventor
Louis Kellner Patented Oct. 11, 1927.

1,645,145

UNITED STATES PATENT OFFICE.

LOUIS KELLNER, OF CHICAGO, ILLINOIS, ASSIGNOR TO CHICAGO FUSE MFG. CO., OF CHICAGO, ILLINOIS, A CORPORATION OF ILLINOIS.

SWITCH.

Application filed July 8, 1925. Serial No. 42,125.

The invention relates to improvements in electric switches, particularly switches of the quick make and break type adapted to be used in electric lighting circuits.

The primary object of the invention is to provide a novel switch which is small and compact in size thereby adapting it to be mounted in shallow outlet boxes, which is simple and inexpensive in construction, and which is efficient and certain in operation.

Further detailed objects and advantages will become apparent as the description proceeds.

In the accompanying drawings, Figure 1 is a vertical sectional view of an outlet box secured in a vertical wall, and having a switch embodying the features of my invention mounted therein.

Fig. 2 is a sectional view of the switch taken along line 2—2 of Fig. 6.

Fig. 3 is a perspective view of one of the two sets of fixed contacts mounted at opposite ends of the switch base.

Fig. 4 is a perspective view of the supporting standard for the operating mechanism, and of one of the kick-off levers.

Fig. 5 is a fragmentary view of the operating mechanism taken substantially along line 5—5 of Fig. 6.

Fig. 6 is a front view of the switch.

Fig. 7 is a sectional view of the switch taken along line 7—7 of Fig. 6, the operating mechanism being shown in one position of rest.

Fig. 8 is a detail view of the operating mechanism shown in the other position of rest.

While the invention is susceptible of various modifications and alternative constructions, I have shown in the drawings and will describe in detail the preferred embodiment, but it is to be understood that I do not thereby intend to limit the invention to the specific form disclosed, but aim to cover all modifications and alternative constructions falling within the spirit and scope of the appended claims.

Referring to the drawings, the switch is adapted to be mounted in any suitable structure or box. For purposes of illustration I have shown one embodiment of my switch mounted in a shallow outlet box 9 which is secured to a wall 10 by a pair of brackets 11 (see Fig. 1). A conduit 12 for lead wires (not shown) extends through a hole 13 in the upper end wall of the box 9, and is rigidly secured thereto by an outer lock nut 14 and an inner threaded bushing 15. The switch is mounted in the box 9 by means of a pair of ears 16 which are secured to lugs 17 struck out from the upper and lower edges of the box. The front of the box 9 is closed by a suitable cover plate 18 which fits against the wall 10 and which is secured to the ears 16 by screws 19.

The switch comprises a hollow base 20, of any suitable insulating material such as porcelain, to the opposite ends of which the supporting ears 16 are secured by means of screws 21. The interior of the base 20 constitutes a chamber 22, open at the front, the sides of which are slightly inclined inwardly and toward each other, and the bottom of which is curved longitudinally.

A plurality of fixed contacts 23 (see Fig. 3) are mounted in the base 20. These contacts can be arranged to provide switches of different characters, such as a single pole switch or a three way switch. In the present instance, I have shown a three way switch in which a pair of opposed contacts 23 is located in each end of the base 20. Each contact 23 consists of a metallic arm having an outer end 24 bent substantially at right angles thereto, and fitting into a notch 25 in the front of the base 20 in which it is secured by a screw 26. The arm extends inwardly along the inclined side of the base 20, and at its inner end is bent outwardly to provide a contact clip 27. The side edge of the clip 27 nearest the center of the base 20 is provided with a triangularly shaped flange 28 which is bent toward the arm. Two terminals 29 having binding screws 30 are positioned in the notches 25 in one side of the base 20, and are connected to the contacts 23 therein by means of the screws 26. The contacts 23 in the other side of the base 20 are similarly connected to a single terminal 31 having a binding screw 32.

Mounted in the base 20 is a switch operating mechanism which comprises a supporting standard 33 resting at its ends in notches 34 formed in the end walls of the base. To secure the standard 33 in position, it is formed at its opposite ends with two lugs 35 extending laterally from opposite sides thereof, and engaging screws 36 extending through the rear wall of the base 20. The heads of the screws 21 and 36 are countersunk in the material of the base and may be covered by filling such as wax.

The standard 33 is centrally formed with a forwardly extending lug 37 on which is pivotally mounted a switch blade 38 adapted to be moved alternately between the contact clips 27 in opposite ends of the base 20, and a lever 39 for actuating the blade. The switch blade 38 (see Figs. 2 and 5) is formed with two spaced arms 40, connected at their inner ends by a cross member 41. The free outer ends of the arms 40 are pivotally mounted at opposite sides of the standard 33 on a pin 42 extending through the lug 37. The lever 39 consists of a metal strip bent double to provide spaced legs 43. The free ends of these legs are mounted on the pivot pin 42 between opposite sides of the lug 37 and the arms 40, and are formed with heels 44 extending a substantial distance inwardly from the pivot pin for a purpose to be hereinafter described. Mounted on the outer end of the lever 39 is a handle 45 of suitable material, such as hard rubber, which extends through a slot 46 in the cover plate 18.

Struck out from opposite sides of the blade 38 and the lever 39 are two pairs of lugs 47 and 48 connected by a pair of coil springs 49. The lugs 47 and 48 are located at opposite sides of the pivot pin 42, and therefore serve to carry the springs 49 across said pin constituting a dead center, as the lever 39 is actuated to snap the blade 38 from one end of the base 20 to the other.

To prevent the blade 38 from sticking, a pair of kick-off levers 50 is provided. These levers (see Fig. 4) are formed with bearings 51 supported in the inner ends of two triangularly shaped slots 52 inclined forwardly and toward opposite edges of the lug 37. The slots 52 are defined by the lug 37 and two inclined lugs 53, the latter being formed with lateral ends 54 extending almost to the lug 37 to provide narrow passageways 55 opening into the forward ends of the slots 52. These passageways 55 permit the kick-off levers 50 to be positioned in the slots 52. Each kick-off lever 50 is formed with an inclined lug 56 movable in the proper slot 52, and extending beyond the sides of the lug 37 for engagement by the inner end of the lever 39. A pair of inwardly extending lugs 57 which lie close to opposite sides of the standard 33 are also formed on each kick-off lever 50, and are adapted to engage the legs 40 of the blade 38 when the lever 39 is moved into engagement with the lug 56.

As illustrated in the drawings, the switch is adapted for use as a three way switch. It is evident however that the switch may be adapted for use as a single pole switch by removing the contacts 23 in one end of the base 20.

In the three way switch, the blade 38 when at rest is always positioned between the contact clips 27 of one set. To snap the blade 38 from one set of clips to the other, the handle 45 is actuated, thereby elongating the springs 49 and bringing them directly over the ends of the pin 42. The heels 44 of the lever 39 engage the lug 56 of the proper kick-off lever 50, and thereby move the lugs 57 against the blade 38 to institute the movement of the latter. Thereupon the springs 49 move across the dead center, and act to complete the movement of the blade 38. The flanges 28 on the clips 27 permit a ready entry of the blade 38, and the curved rear wall of the base permits the blade to swing freely.

It will be evident that I have provided a simple and inexpensive switch. By providing a single and central supporting standard, a switch which is compact and exceptionally small is obtained. The switch can therefore be used to particular advantage in those instances where the use of a small size switch is an important consideration. The operation is positive and certain.

I claim as my invention:

1. A switch having, in combination, a base having opposed notches in its end walls, a supporting standard resting at its ends in said notches, a plurality of fixed contacts, a pivot on said standard, a switch blade mounted on said pivot, said switch blade extending along opposite sides of said standard and being mounted to swing into and out of selective engagement with said contacts, an operating lever mounted on said pivot, spring means connecting said blade and said lever at points on opposite sides of said pivot, said spring means being adapted to shift said blade upon movement past the dead center, and a pair of kick-off levers mounted in said standard, said kick-off levers being in position for engagement by said lever to institute the movement of said blade.

2. A switch having, in combination, a base having a plurality of fixed contacts, a single supporting standard securely mounted in said base, said supporting standard being formed with a central lug and with two slots formed on opposite sides of said lug, a switch blade pivotally mounted on said lug, an operating lever pivotally mounted on said lug, spring means connecting said operating lever to said blade, and a pair of kick-off levers loosely mounted in said slots, said kick-off levers being positioned for engagement by said operating lever to institute the movement of said blade upon actuation of said lever.

3. A switch having in combination, a base having a plurality of contacts fixed therein, a central supporting standard mounted completely within said base, a switch blade pivotally mounted on said standard, said blade having legs straddling the lower edge of said standard, and operating means for said switch blade, said means including a lever pivotally mounted on said standard, said blade and said lever having a common pivot, and said lever having legs straddling the upper edge of said standard and overlapping with the legs of said blade.

4. A switch having, in combination, a plurality of fixed contacts, a central standard, said standard having a pivot and having two triangularly shaped slots at opposite sides of said pivot, a pair of kick-off levers loosely mounted in said slots, a switch blade mounted on said pivot for movement between said kick-off levers, an operating lever mounted on said pivot, said operating lever having heels adapted to selectively engage said kick-off levers to institute movement of said blade, and spring means for completing the movement of said blade.

5. A switch having, in combination, a base having a plurality of fixed contacts, a central supporting standard mounted in said base, a switch blade and an operating lever therefor mounted on said standard, said blade and said lever each having legs extending on opposite sides of said standard and in overlapping relation, two springs, one on each side of said standard connecting said blade and said lever, and a pair of kick-off levers mounted in said standard for limiting the movement of said blade and for instituting the movement of said blade.

6. A switch having in combination, a base, a central standard fitting completely within said base, means for securing said standard in position, a plurality of fixed contacts in the base, a switch blade pivotally mounted on said standard, said blade having legs extending along opposite sides of said standard, means for operating said blade, said means including an operating lever having legs straddling said standard, and a pair of kick-off members pivotally mounted in and extending through opposite ends of said standard, said kick-off members being adapted to alternately engage both legs of said blade.

In testimony whereof, I have hereunto affixed my signature.

LOUIS KELLNER.